Dec. 31, 1968  W. A. SOURS  3,418,705
METHOD AND APPARATUS FOR MOUNTING SHAFTS AND
LIKE DEVICES IN PLASTIC CABINETS
Filed June 15, 1966

INVENTOR:
WILLIAM A. SOURS,
BY *William S Wolfe*
HIS ATTORNEY.

United States Patent Office 3,418,705
Patented Dec. 31, 1968

3,418,705
METHOD AND APPARATUS FOR MOUNTING SHAFTS AND LIKE DEVICES IN PLASTIC CABINETS
William Aluah Sours, Sauquoit, N.Y., assignor to General Electric Company, a corporation of New York
Filed June 15, 1966, Ser. No. 557,700
5 Claims. (Cl. 29—149.5)

ABSTRACT OF THE DISCLOSURE

A method and apparatus for mounting an elongated rotatable member, such as a shaft or threaded member, to a cabinet through the use of an integrally molded, open-ended cradle, the cradle receiving the rotatable member and then being heat deformed to capitivate the rotatable member.

---

The present invention relates to a method and apparatus for mounting shafts and like devices in plastic cabinets, and more specifically, to such apparatus for use in mass produced consumer devices such as phonoviewers.

It is necessary in many instances to mount rotatable shafts and threaded members such as screws to plastic cabinets in mass produced items such as phonoviewers.

It is necessary in many instances to mount rotatable shafts and threaded members such as screws to plastic cabinets in mass produced items such as phonoviewers. In the past it has been necessary to employ discrete mounting means for such elements, such mounting means being themselves mounted to the cabinet. Alternatively, where mounting means molded integrally with the cabinet have been employed, special molding techniques have been required. The problems associated with such molding techniques impose severe design restrictions on the location of the shafts and threaded members. Further, in many instances, inserts or bushings had to be provided to insure the necessary tolerances. Accordingly, the prior art mounting apparatus of this type was both complex and unduly expensive and necessitated time-consuming assembly operations.

The present invention provides a simplified apparatus and method for mounting shafts and like devices to plastic cabinets.

Accordingly, an object of the invention is to provide an improved method and apparatus for the mounting of shafts and like devices in plastic cabinets.

Another object is to provide an inexpensive apparatus for mounting shafts and like devices which is less complex than prior art devices.

A further object is to provide an apparatus for mounting shafts and like devices which minimizes assembly time.

These and other objects are achieved in one embodiment of the invention by the provision of a molded open-ended cradle to receive a metal shaft or threaded member. The cradle is heat deformed to close the open end thereby captivating the shaft or threaded member. In this manner a close tolerance mount for a shaft is realized while not interfering with shaft rotation since the heat deformed plastic material forms itself closely to the contour of the shaft without adhereing thereto. Similarly, the heat deformed material will automatically conform to the contour of a threaded member thereby providing the necessary threads.

Figure 1:
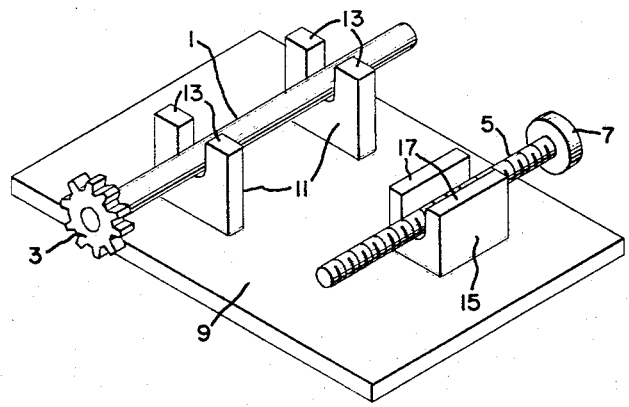
Figure 2:
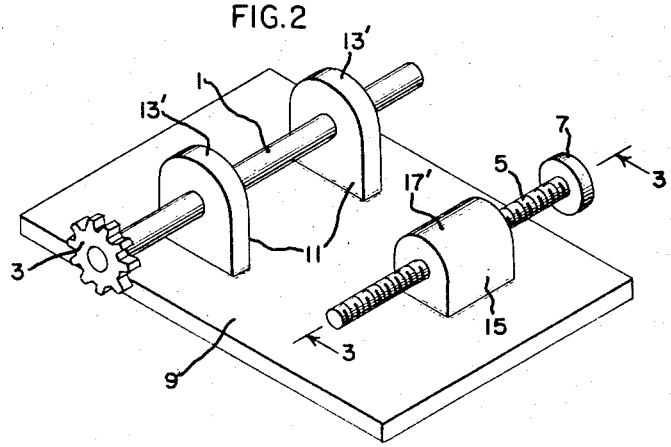
Figure 3:
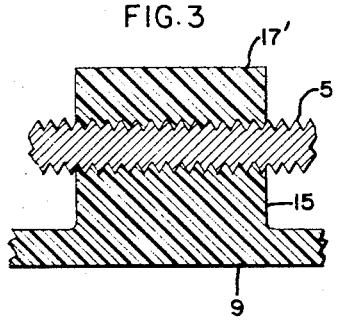

The novel and distinctive features of the invention are set forth in the appended claims, the invention itself together with further objects and advantages thereof, may best be understood by reference to the accompanying drawings in which:

FIG. 1 is a perspective view of a partially assembled apparatus in accordance with the invention, FIG. 2 is a view similar to FIG. 1 with the apparatus shown completely assembled, and FIG. 3 is a cross-sectional view of the screw assembly shown in FIG. 2.

Referring to FIG. 1 there is shown for purposes of illustration a metal shaft 1 having a gear 3 affixed thereto and a metal threaded member 5 having a control knob 7 attached thereto.

The shaft 1 and the threaded member 5 are assembled to the plastic cabinet 9 of a device such as a phonoviewer. The shaft 1 and threaded member 5 will, of course, cooperatae with various other elements of such a device, although for simplicity such elements have not been shown.

In accordance with the invention the shaft 1 is mounted through the use of a pair of spaced cradle members 11 integrally molded with the plastic cabinet 9, each cradle member 11 including a pair of spaced, outwardly extending arms 13 defining a U-shaped opening to receive the shaft 1.

Similarly, the threaded member 5 is received by a cradle member 15 provided with a pair of spaced, outwardly extending arms 17 defining a U-shaped opening to receive the threaded member.

In accordance with the invention the plastic material comprising the arms 13 and 17 of the cradles 11 and 15 respectively is heat deformed as shown in FIG. 2 to mount the shaft and the threaded member to the cabinet 9.

Thus, for example, the cabinet and the associated cradles may be formed from a plastic material such as polystyrene in which event a tool heated to approximately 300° to 400° F. may be employed to heat deform the arms 14 and 17 respectively to captivate the shaft 1 and the threaded member 5 in the desired fashion.

It is found that by heating the arms 13 in this fashion the plastic material conforms to the contour of the shaft and a close tolerance fit is achieved between the shaft and the plastic material even though the dimension of the cradle might vary over a relatively wide range. Further, since the plastic material will not adhere to the metal shaft, rotation of the shaft is not impeded.

Similarly, it is found that by heat deforming the arms 17 in accordance with the invention, the plastic material conforms to the contour of the screw thus automatically forming the desired threads with a high degree of precision. Thus, referring to FIG. 3 it is seen that the plastic material fills the threads in the desired fashion while not adhering thereto. It will be appreciated that in most instances it will be unnecessary to form screw threads around the complete circumference of the threaded member 5 as shown in FIG. 3 and that a thread over only a portion of that circumference will suffice.

Although the invention has been described with respect to certain specific embodiments it will be appreciated that modifications and changes may be made by those skilled in the art without departing from the true spirit and scope of the invention.

What I claim and desire to secure by Letters Patent of the United States is:

1. A method for mounting an elongated rotatable member to a plastic cabinet comprising:
    (a) integrally molding a cradle member and including a pair of spaced outwardly extending arms with the cabinet,
    (b) positioning the rotatable member in said cradle between said arms, and
    (c) heat deforming said arms to conform to the rotatable member to rotatably mount the rotatable member in said cradle.

2. The method defined in claim 1 wherein said rotatable member is a shaft member.

3. The method defined in claim 1 wherein said rotatable member is a threaded member.

4. The method defined in claim 1 wherein said cabinet including said cradle is injection molded from a polystyrene plastic material.

5. The method defined in claim 4 wherein said arms are deformed by application of a tool heated to a temperature in the range of 300° F. to 400° F.

References Cited

UNITED STATES PATENTS

| | | | |
|---|---|---|---|
| Re. 25,624 | 7/1964 | Stahl | 264—249 X |
| 930,241 | 8/1909 | Sibert | 29—509 X |
| 1,690,408 | 11/1928 | Hasenflue | 29—443 X |
| 1,994,428 | 3/1935 | Keil | 29—437 X |
| 2,064,342 | 12/1936 | England | 29—437 |
| 2,464,524 | 3/1949 | Nathan | 264—242 |
| 2,705,346 | 4/1955 | Schlabach et al. | 264—242 X |
| 3,166,618 | 1/1965 | Fehling et al. | 264—242 |
| 3,206,801 | 9/1965 | Costa et al. | 264—242 X |
| 3,266,135 | 8/1966 | Morin | 264—242 X |
| 3,308,225 | 3/1967 | Wells | 264—249 |

FOREIGN PATENTS

| | | |
|---|---|---|
| 298,031 | 10/1928 | Great Britain. |
| 724,377 | 8/1942 | Germany. |

MARTIN P. SCHWADRON, *Primary Examiner.*

FRANK SUSKO, *Assistant Examiner.*

U.S. Cl. X.R.

29—436, 509; 308—15